United States Patent [19]

Reichner et al.

[11] Patent Number: 4,983,471
[45] Date of Patent: Jan. 8, 1991

[54] ELECTROCHEMICAL CELL APPARATUS HAVING AXIALLY DISTRIBUTED ENTRY OF A FUEL-SPENT FUEL MIXTURE TRANSVERSE TO THE CELL LENGTHS

[75] Inventors: Philip Reichner, Plum Borough; Walter J. Dollard, Churchill Borough, both of Pa.

[73] Assignee: Westinghouse Electric Corp., Pittsburgh, Pa.

[21] Appl. No.: 458,021

[22] Filed: Dec. 28, 1989

[51] Int. Cl.$^5$ ............................................. H01M 8/06
[52] U.S. Cl. ........................................ 429/19; 429/20; 429/31
[58] Field of Search ..................... 429/17, 19, 20, 31

[56] References Cited

U.S. PATENT DOCUMENTS

| | | | |
|---|---|---|---|
| 3,718,506 | 2/1973 | Fischer et al. | 136/86 C |
| 4,395,468 | 7/1983 | Isenberg | 429/31 |
| 4,490,444 | 12/1984 | Isenberg | 429/31 |
| 4,729,931 | 7/1988 | Gimble | 429/17 |
| 4,808,491 | 2/1989 | Reichner | 429/17 |
| 4,812,373 | 3/1989 | Grimble et al. | 429/19 |

Primary Examiner—Donald L. Walton
Attorney, Agent, or Firm—Daniel P. Cillo

[57] ABSTRACT

An electrochemical apparatus (10) is made having a generator section (22) containing axially elongated electrochemical cells (16), a fresh gaseous feed fuel inlet (28), a gaseous feed oxidant inlet (30), and at least one gaseous spent fuel exit channel (46), where the spent fuel exit channel (46) passes from the generator chamber (22) to combine with the fresh feed fuel inlet (28) at a mixing apparatus (50), reformable fuel mixture channel (52) passes through the length of the generator chamber (22) and connects with the mixing apparatus (50), that channel containing entry ports (54) within the generator chamber (22), where the axis of the ports is transverse to the fuel electrode surfaces (18), where a catalytic reforming material is distributed near the reformable fuel mixture entry ports (54).

23 Claims, 2 Drawing Sheets

ELECTROCHEMICAL CELL APPARATUS HAVING AXIALLY DISTRIBUTED ENTRY OF A FUEL-SPENT FUEL MIXTURE TRANSVERSE TO THE CELL LENGTHS

GOVERNMENT CONTRACT

The Government of the United States of America has rights in the invention pursuant to Contract No. DE-AC21-80ET-17089, awarded by the United States Department of Energy.

BACKGROUND OF THE INVENTION

This invention relates to an electrochemical apparatus containing a plurality of parallel, elongated electrochemical cells, each cell having an exterior fuel electrode, where a mixture of fresh feed fuel and recirculated spent fuel can contact the fuel electrodes of the cells, the mixture being introduced transversely to the axial length of the cells in a relatively uniform fashion, and where the mixture contains at least water vapor. Reformation of the fresh feed fuel in the mixture takes place at or near the exterior surfaces of the elongated cells.

High temperature, solid oxide electrolyte fuel cell generator apparatus and fuel cell configurations are well known, and taught, for example, in U.S. Pat. Nos. 4,395,468 and 4,490,444 respectively (Isenberg). There, feed fuel, either $H_2+CO$, or previously reformed natural gas, is fed into the apparatus at one end and flows parallel to exterior fuel electrode surfaces of elongated fuel cells. Spent fuel is combusted with spent oxidant in a separate chamber and then exits the apparatus.

Other high temperature fuel cell generator apparatus designs are known, where spent fuel is recirculated and aspirated into fresh, preheated feed fuel, in the center of the apparatus, which mixture is fed through the fuel cells, as taught in U.S. Pat. No. 3,718,506 (Fischer et al.). There, spent fuel exiting from the fuel cells, is mixed with fresh feed fuel, such as propane, at a jet-pump nozzle, for flow from one end to the other of the series connected fuel cells. This combination of spent fuel with fresh fuel prevents soot formation within the cells. Additional spent fuel mixes with spent air and flows around and through a catalytic afterburner structure surrounding the fuel cells. Thisi causes complete combustion, which heats the fuel cells, allowing efficient operation at approximately 800° C.

Another generator design to prevent chilling of the fuel cells is taught in U.S. Pat. No. 4,808,491 (Reichner), where a combusted exhaust of spent fuel and spent oxidant provides corner heating in the generator apparatus. There, fresh feed fuel is fed into a manifold at the bottom of the apparatus, the bottom of which manifold may contain reforming catalyst and may be heated by the combusted exhaust. The feed fuel then flows parallel to the exterior fuel electrode surfaces of the elongated fuel cells. The fresh feed fuel is not mixed with any spent gases within the apparatus.

Natural gas (methane plus ethane, propane, butane and nitrogen) may be a likely fuel for many of these fuel cell apparatus. This natural gas must be reformed, that is, converted to carbon monoxide and hydrogen, through the use of a catalyst and excess water vapor, prior to its utilization in the fuel cell. The reforming reaction is endothermic, requiring a supply of heat, and is best performed at temperatures close to 900° C. The heat required for reforming is a significant fraction of the excess heat that results from fuel cell operation.

Without provision of a heat source, such as the exhaust gas stream of U.S. Pat. No. 4,808,491 described previously, if the reformer is located at the base of the fuel cell core, the normal fuel inlet, thermal gradients may be induced along the cell length. Internal reformation of natural gas fuel directly on an inactive, external fuel cell surface, where the fuel is fed into the base of the fuel cell core, and flows parallel to the exterior fuel electrode surfaces, has been taught in U.S Patent No. 4,374,184 (Somers et al.). This process relieved, somewhat, excessive thermal gradients in the generator region. However, the diffusion velocity of reformable fuel, such as natural gas, in the transverse direction to the exterior fuel cell wall is very high; so that reforming of the fuel occurs rapidly along the fuel cell axial length if catalysis at the fuel cell wall is efficient. In this design, all the reformable fuel needed for the full length of the fuel cell could be reformed in the first $\frac{1}{3}$ or less of each fuel cell length. Additionally, in the Somers et al. design, a substantial amount of potential fuel cell active length is lost due to the end cell geometry and the temperature drop.

In an effort to solve some of these problems, a system was designed, as taught in U.S. Pat. No. 4,812,373 (Grimble et al.), where separate fuel feed conduits were used exterior and parallel to, and disposed between the fuel cells, to distribute unreformed, fresh feed fuel along the entire exterior active length of the fuel cells. This allows reforming along the entire length of the fuel cells. Here, steam is incorporated into the feed fuel outside of the generator apparatus requiring a separate heater, mixer and tubing. A plurality of feed conduits is also required, all requiring support plates, each conduit being either open ended, in which case fuel is also fed into the base of the apparatus, or closed ended but porous or minutely perforated.

What is needed is an apparatus having optimally distributed fuel introduction along the entire cell, with use of spent fuel which contains water vapor, to add sufficient water vapor to the fresh fuel to allow in-situ reformation by a catalytic reformer material, which is optimally distributed along the cell length. It is one of the main objects of this invention to provide such an apparatus.

SUMMARY OF THE INVENTION

Accordingly, the invention generally resides in an electrochemical apparatus that allows mixing of fresh feed fuel with hot spent fuel, feeding this mixture to contact the axial length of the cells in a manner substantially transverse to the cell lengths, and reforming the fresh feed fuel at the cells or at a reforming structure near the cells. The invention more specifically resides in an electrochemical apparatus having: an axially elongated generator chamber containing one or more cell bundles, each bundle containing a plurality of parallel, axially elongated electrochemical cells, each cell having an exterior fuel electrode an interior air electrode, and solid oxide electrolyte therebetween; fresh gaseous feed fuel inlet; gaseous feed oxidant inlet; at least one gaseous spent fuel exit; a combustion chamber; and at least one combusted exhaust gas channel; characterized in that, a spent fuel exit channel passes from the generator chamber to combine with the fresh feed fuel inlet at a mixing apparatus; a reformable fuel mixture channel passes through the axial length of the generator chamber and connects with the mixing apparatus, said channel containing reformable fuel mixture entry ports along the length of the electrochemical cells within the generator chamber, where the axis of the ports is transverse to the exterior fuel electrode surfaces; and where a catalytic reforming material is distributed parallel to the axially elongated electrochemical cells. In operation, these channels allow recirculation of a portion of the spent fuel to mix with fresh feed fuel, and provide a reformable fuel mixture which can pass into the generator chamber, and also allows reformable fuel mixture contact with the reforming material near the reformable fuel mixture entry ports, either on the cells themselves and/or on a separate reforming structure.

The invention also resides in that the spent fuel exit channel contains multiple entry ports along the length of the electrochemical cells, the mixing apparatus is an ejector mechanism, the reformable fuel mixture channels can have an associated porous outer partition containing catalytic reforming material, and the cell bundles can be substantially separated by at least one wall of ceramic tiles or liners The invention further resides in an electrochemical apparatus operating on gaseous oxidant and a fresh gaseous feed fuel, at an interior temperature between 600° C. and 1,200° C., having: a generator chamber containing one or more cell bundles, each bundle containing a plurality of parallel, axially elongated electrochemical cells, each cell having an exterior fuel electrode, an interior air electrode, and solid oxide electrolyte therebetween; fresh gaseous feed fuel inlet; gaseous feed oxidant inlet; gaseous spent fuel exit, where the spent fuel contains water vapor; and a combustion chamber where hot spent gaseous fuel and hot spent gaseous oxidant combust to form combusted exhaust gas; characterized in that, a portion of the spent fuel is recirculated through a spent fuel exit channel to mix with fresh feed fuel at a mixing apparatus, providing a reformable fuel mixture; the reformable fuel mixture is channeled to contact the exterior fuel electrode surfaces of the electrochemical cells within the generator chamber, and such contact is substantially transverse to the exterior fuel electrode surfaces and along the length of the cells; and where the reformable fuel mixture contacts a catalytic reforming material which is distributed parallel to the axially elongated electrochemical cells.

The term "fuel electrode" as used herein means that electrode in contact with fuel, the term "air electrode" as used herein means that electrode in contact with air or oxygen, and the term "spent" fuel, oxidant, or air as used herein means partially reacted, low BTU fuel or partially reacted, depleted oxidant or depleted air containing about 5% to 15% oxygen. The term "spent" fuel does not include the mixture of spent fuel combusted with spent oxidant or air, which mixture is herein defined as "combusted exhaust gas".

The electrochemical cell apparatus of the invention distributes reformable fuel mixture all along the active cell/bundle length in an optimum transverse direction to the axis of the cells, allows water vapor introduction into the fresh feed fuel by interior spent fuel recirculation, eliminating use of exterior boilers, and the catalytic reforming material is optionally distributed all along the cell length, rather than near the feed entry.

Also, this design makes possible a controlled axial distribution of the reforming reaction, so that more heat is consumed in those cell regions which would otherwise operate at a higher temperature, and this permits reduction in the air feed rate and compressor power input, while maintaining acceptable temperature uniformity. Elimination of external water addition to the fresh fuel and reduction of air compressor power, both increase the overall efficiency of the electrochemical apparatus. The uniform temperature improves cell life and electrical efficiency.

BRIEF DESCRIPTION OF THE DRAWINGS

In order that the invention can be more clearly understood, conventional embodiments thereof will now be described, by way of example, with reference to the accompanying drawings, in which.

DESCRIPTION OF THE PREFERRED EMBODIMENTS

Figure 1:
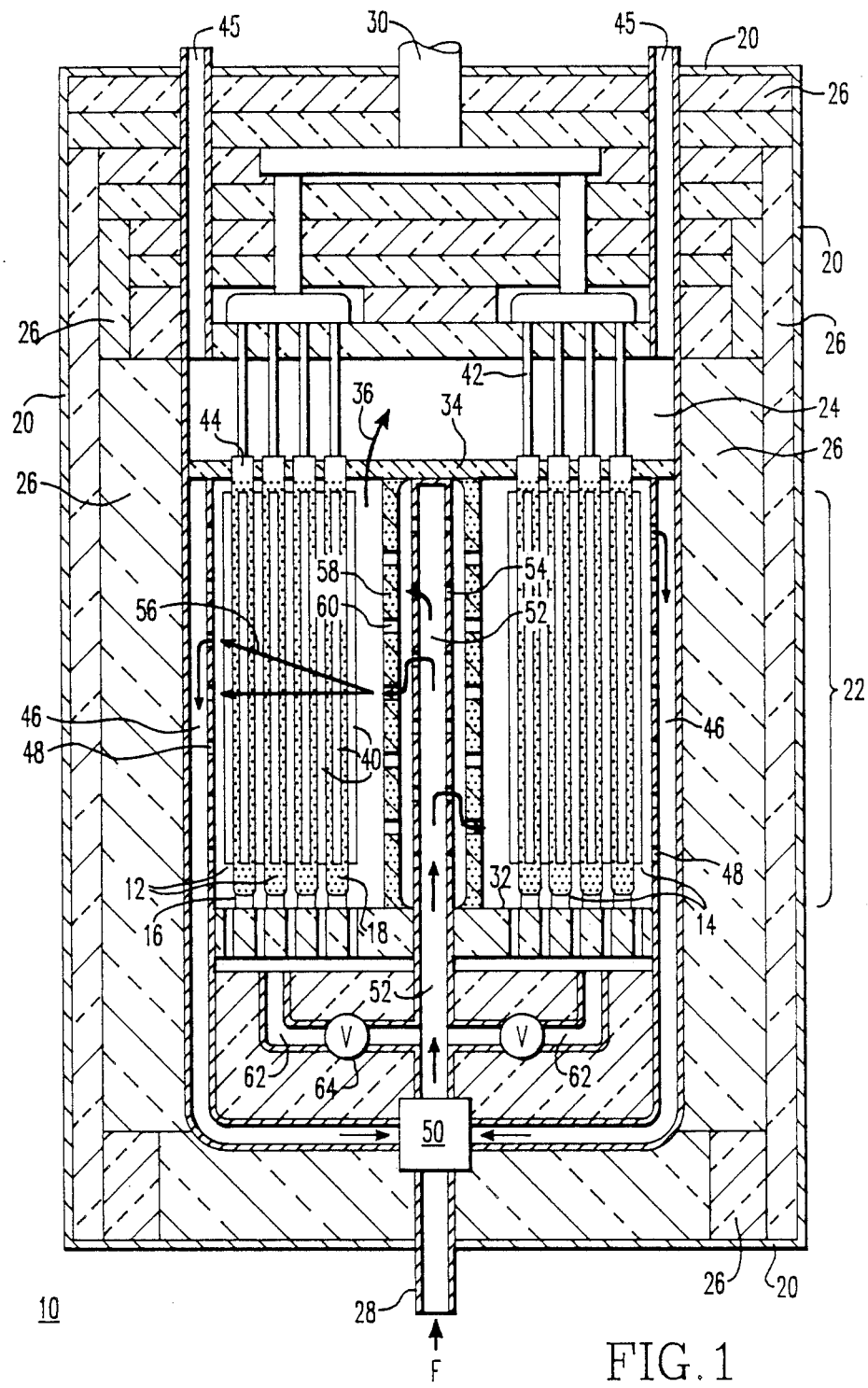
FIG. 1, which best illustrates the invention, is a side view in section of one embodiment of an electrochemical cell apparatus according to this invention, showing recirculation of spent fuel, mixture with incoming fresh fuel feed, and transverse feed of the reformable feed fuel mixture to the fuel cell surfaces.

Referring now to FIG. 1, an electrochemical cell apparatus or generator 10 is shown containing two cell bundles 12 and 14, each bundle containing a plurality of parallel, axially elongated electrochemical cells 16, such as solid oxide fuel cells. The cells are located in generator compartment or section 22. Each cell has an exterior fuel electrode 18 covering its surface, shown dotted for the sake of clarity, an interior air electrode, and a solid oxide electrolyte between the electrodes (air electrode and electrolyte not shown), as is well known in the art. The air electrode is generally a doped ceramic of the perovskite family, for example, doped $LaMnO_3$, the electrolyte is generally yttria stabilized zirconia, and the fuel electrode is generally a zirconia-nickel cermet material. A calcia stabilized zirconia support for the air electrode can also be used. For a detailed description of the materials and construction of an exemplary fuel cell, reference can be made to U.S. Pat. No. 4,490,444, herein incorporated by reference.

The electrochemical cell apparatus 10 will operate with an interior temperature in the range of from about 600° C. to about 1,200° C. An outer housing 20 surrounds the entire apparatus. An inner housing, not shown, surrounds a plurality of chambers, including the generator chamber 22 and a combustion chamber 24, and is preferably comprised of a high temperature resistant metal such as Inconel. Thermal insulation 26, such as low density alumina insulation boards is contained within the outer housing as shown Penetrating the housing 20 and insulation 26 is fresh feed fuel inlet 28, the fresh feed fuel shown as F, and an oxidant, such as air or oxygen, feed inlet 30, as well as ports for electrical leads and the like, not shown. The generator chamber 22 extends between wall 32 and a porous barrier 34. The porous barrier 34 need not be a sealed structure. The porous barrier 34, in particular, is designed to allow spent fuel gas exit, indicated by arrow 36, between the generator chamber 22, operating at an approximate pressure slightly above atmospheric, and the combustion chamber 24, operating at a slightly lower pressure.

High temperature, elongated, solid oxide electrolyte cells 16 extend between the combustion chamber 24 and the wall 32. The cells have open ends 44 in the combustion chamber 24, and closed ends in the generating chamber 22 near wall 32. Each individual cell generates approximately one volt on open circuit, and a plurality are electrically interconnected through conducting felts 40, usually nickel fiber metal, preferably in a series-parallel rectangular array, as described in U.S. Pat. No. 4,395,468, herein incorporated by reference.

By way of example, during operation, a gaseous oxidant, such as air, is fed through oxidant feed inlet 30, and enters the oxidant feed conduits 42 at a temperature of approximately 500° C. to 700° C., and a pressure above atmospheric, being optionally heated prior to entering the housing by conventional means, such as a heat exchanger coupled with a blower. The oxidant, within the conduits, is passed through the combustion chamber 24, where it is further heated to a temperature of approximately 800° C. to 900° C. by the combusted exhaust gas. The oxidant then flows through the length of the oxidant circuit, through the conduits 42 which extend down the inside length of the fuel cells, being further heated to approximately 1,000° C., by virtue of absorbing most of the heat generated during the electrochemical reaction A smaller fraction of the heat is absorbed by the fuel.

The oxidant is discharged into the closed end, i.e. bottom of the fuel cells 16. The oxidant within the fuel cells reverses direction, and electrochemically reacts at the inner air electrode along the inside active length of the cells, depleting somewhat in oxygen content as it approaches the open ends 44 of the cells. The depleted oxidant is then discharged into the combustion chamber 24 through the open cell ends 44, where it combusts with depleted fuel, part of the total of which passes through porous barrier 34 as shown by arrow 36, to form combusted exhaust gas, which exits the apparatus, through, for example one or more exhaust channels 45.

In this invention, a gaseous, fuel that has not yet been reformed, such as a gaseous hydrocarbon, including hydrocarbons such as methane ($CH_4$), ethane ($C_2H_6$), propane ($C_3H_8$), and the like, vaporized petroleum fractions such as naphtha, and alcohols such as ethyl alcohol ($C_2H_5OH$), and the like, and natural gas, that is, a mixture of 85% methane, and 10% ethane with a balance of propane, butane and nitrogen, can be used. Fuel medium F is fed into the generator through fresh feed fuel inlet 28.

In this invention, a major portion of the hot spent fuel formed along the axial length of the cells 16 passes to at least one spent fuel channel 46, which can be made of a high temperature resistant metal such as Inconel, having entry holes or ports 48 therein, as shown, allowing entry into the channel. Another portion of the hot spent fuel exits into combustion chamber 24, as previously described, to combust with spent air and preheat the fresh oxidant feed. The spent fuel channel 46 connects with the fresh feed fuel inlet 28 at a mixing apparatus or means 50, which can be of any type known in the art, for example, an ejector, jet pump, aspirator, or the like. This allows recirculation of a portion of the spent fuel to mix with the fresh feed fuel at mixer 50, to provide a reformable fuel mixture.

The reformable fuel mixture will contain at least water vapor (steam), and usually also $H_2$, CO and $CO_2$, all contributed by the spent fuel that enters mixer 50. Preferably, the volume ratio of spent fuel to fresh feed fuel will be adjusted in the mixer 50 so that approximately 2 volumes to 5 volumes of water vapor and $CO_2$ are added to each volume of fresh feed fuel The presence of water vapor plus a reforming catalyst, most commonly Ni, allows conversion of any gaseous hydrocarbons to $CO+H_2$, by the reaction:

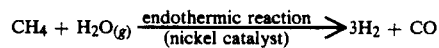

$$CH_4 + H_2O_{(g)} \xrightarrow[\text{(nickel catalyst)}]{\text{endothermic reaction}} 3H_2 + CO$$

A similar fuel conversion reaction to $H_2$ and CO is accomplished with $CO_2$ in place of water vapor.

At least one porous reformable fuel mixture channel 52 passes through the axial length of the generator chamber and connects the mixing apparatus 50, with reformable fuel mixture entry ports 54 or the like distributed along the length of the electrochemical cells, where the axis of the ports 54, that is, the axis of the holes in the channel 52, is transverse to the exterior fuel electrode surfaces of the electrochemical cells, and to the length of the reformable fuel mixture channel 52 These ports allow entry of the reformable fuel into the generator chamber. This allows substantially transverse contact of the reformable fuel mixture, passing through channel 52, with the exterior fuel electrode surfaces, along the length of the cells, as shown by arrows 56. This transversely moving, reformable fuel mixture, shown by arrows 56, will contact a catalytic reforming material, preferably nickel, distributed parallel to the axially elongated electrochemical cells near the reformable fuel mixture entry ports 54.

In the embodiment shown in FIG. 1, at least one porous partition 58, having ports 60 or the like distributed along the length of the electrochemical cells is connected with and disposed between the reformable fuel mixture entry ports 54 and the cells, where the axis of the ports 60, similarly to entry ports 54, is also transverse to the exterior fuel electrode surfaces of the electrochemical cells, and to the length of the partition 58. These partitions 58 can have catalytic reforming material, preferably nickel, distributed on its surface or impregnated into its volume. As an alternative, the reforming partition can be eliminated and the catalytic reforming material, preferably nickel, can be distributed on the cells, for example, on the surface of or impregnated into the fuel electrode layer 18, or can be on the conductive nickel felt connectors 40 of the cells them selves. In other cases both sources of reforming can be used In all cases, there is substantially transverse contact of the reformable fuel mixture with the exterior fuel electrode surfaces, along the length of the cells, as shown by arrows 56.

Also shown are auxiliary, reformable fuel mixture channels 62 with associated valve 64 feeding to the generator chamber, which, optionally, can supply a minor portion of reformable fuel mixture to the very bottom of the cell bundles, through bottom ports parallel to the axial length of the cells, where transverse contact might be difficult.

Figure 2:
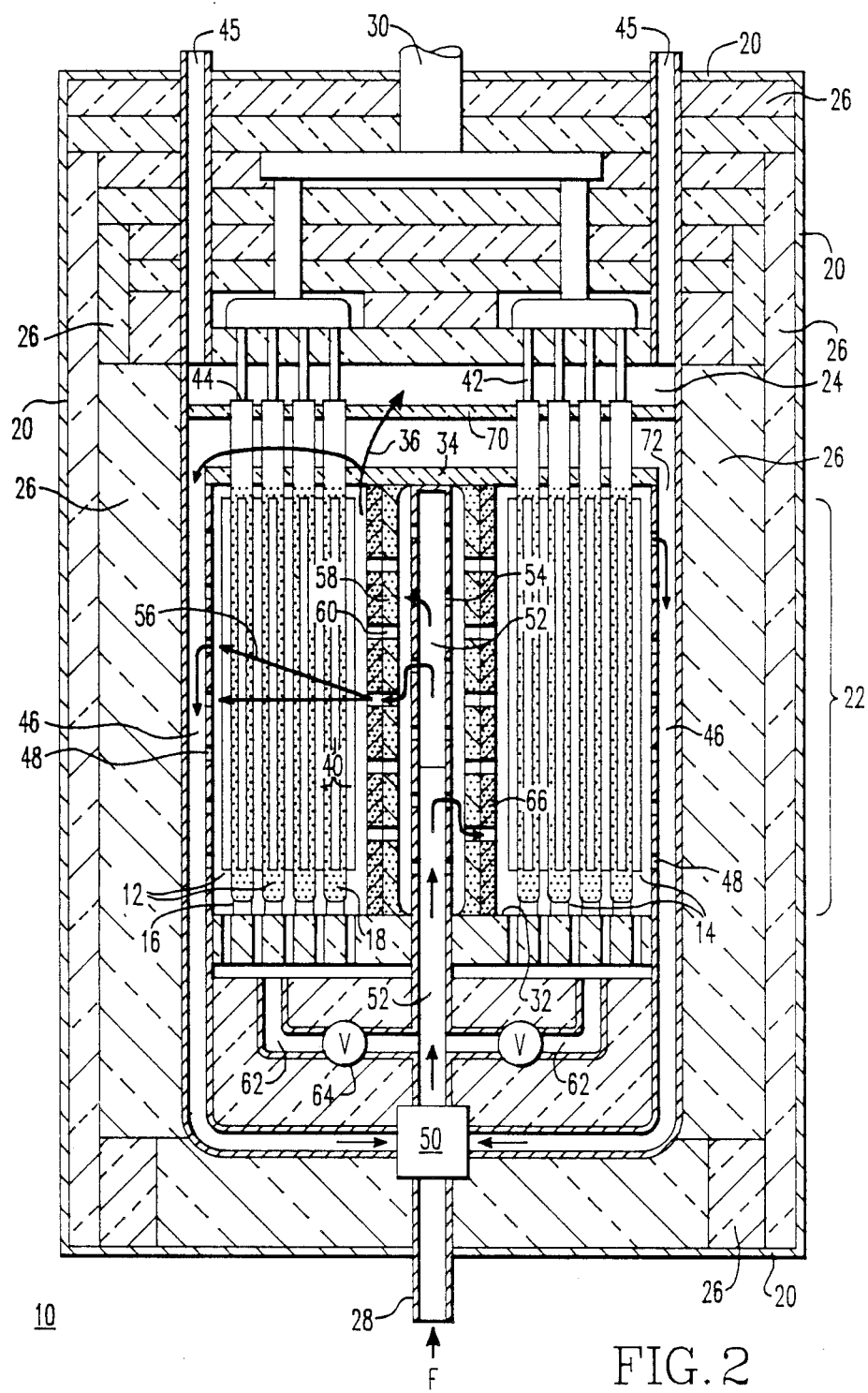
FIG. 2 is another embodiment of the invention showing dense partition tiles separating cell bundles.

FIG. 2 shows another embodiment of the invention, where gas-impermeable, thin, dense metal or ceramic barrier sheets or tiles 66 are inserted between cell bundles 12 and 14, to provide a substantial diffusion barrier in the event of a cell failure that would otherwise result in leakage of oxygen into the reformable fuel mixture channels 52. The sheets or tiles 66 are shown attached to the outside walls of partition 58, but can be placed on the inside walls of partition 58 or on the reformable fuel mixture channel 52. The diffusion barrier 66 helps to isolate cell bundles 12 and 14 and thus substantially prevents propagation of the cell failure to adjacent bundles Recirculating spent fuel, in this case, may be extracted along the length of the cells or at the end of the cell bundle rows, as shown. An additional porous barrier 70 can be placed above barrier 34 providing additional capture of spent fuel for recirculation and exit through openings 72 at the top of the generator section 22.

We claim:

1. An electrochemical apparatus comprising: (1) an axially elongated generator chamber containing one or more cell bundles, each bundle containing a plurality of parallel, axially elongated electrochemical cells, each cell having an exterior fuel electrode, an interior air electrode, and solid oxide electrolyte therebetween, (2) fresh gaseous feed fuel inlet, (3) gaseous feed oxidant inlet, (4) at least one gaseous spent fuel exit, (5) a combustion chamber, and (6) at least one combusted exhaust gas channel, where a spent fuel exit channel passes from the generator chamber to combine with the fresh feed fuel inlet at a mixing apparatus; a reformable fuel mixture channel passes through the axial length of the generator chamber and connects with the mixing apparatus, said channel containing reformable fuel mixture entry ports along the length of the electrochemical cells within the generator chamber, where the axis of the ports is transverse to the exterior fuel electrode surfaces; and where a catalytic reforming material is distributed parallel to the axially elongated electrochemical cells.

2. The apparatus of claim 1, where the chambers are within a metal housing lined with insulation, and the catalytic reforming material is near the reformable fuel mixture entry ports.

3. The apparatus of claim 1, where the electrochemical cells are fuel cells, the air electrode contains doped $LaMnO_3$, the electrolyte is yttria stabilized zirconia and the fuel electrode contains a zirconia-nickel nickel cermet material.

4. The apparatus of claim 1, where the spent fuel exit channel contains multiple entry ports along the length of the electrochemical cells and the reformable fuel mixture channel has an associated porous outer partition containing catalytic reforming material.

5. The apparatus of claim 1, where the mixing apparatus is an ejector mechanism.

6. The apparatus of claim 1, where thin, gas impermeable material separates cell bundles in the generator chamber.

7. The apparatus of claim 1, also containing auxiliary, reformable fuel mixture channels feeding to the generator chamber with ports parallel to the axial length of the cells.

8. The apparatus of claim 1, where catalytic reforming material is distributed on the cells.

9. The apparatus of claim 4, where catalytic reforming material is also distributed on the cells.

10. The apparatus of claim 4, where the outer partition has ports along the length of the electrochemical cells, the axis of the ports is transverse to the exterior fuel electrode surfaces, and the partition has a nickel containing material distributed on its surface or impregnated into its volume.

11. The apparatus of claim 6, where the gas impermeable material is selected from the group consisting of metal and dense ceramic tiles.

12. An electrochemical apparatus operating on gaseous oxidant and a fresh gaseous feed fuel, at an interior temperature between 600° C. and 1,200° C., comprising a generator chamber containing one or more cell bundles, each bundle containing a plurality of parallel, axially elongated electrochemical cells, each cell having an exterior fuel electrode, an interior air electrode, and solid oxide electrolyte therebetween; fresh gaseous feed fuel inlet; gaseous feed oxidant inlet; gaseous spent fuel exit, where the spent fuel contains water vapor; and a combustion chamber where hot spent gaseous fuel and hot spent gaseous oxidant combust to form combusted exhaust gas, where a portion of the spent fuel is recirculated through a spent fuel exit channel to mix with fresh feed fuel at a mixing apparatus, providing a reformable fuel mixture; the reformable fuel mixture is channeled to contact the exterior fuel electrode surfaces of the electrochemical cells within the generator chamber, and such contact is substantially transverse to the exterior fuel electrode surfaces and along the length of the cells, and where the reformable fuel mixture contacts a catalytic reforming material which is distributed parallel to the axially elongated electrochemical cells.

13. The apparatus of claim 12, where the chambers are within a metal housing lined with insulation, and the catalytic reforming material is near the reformable fuel mixture entry ports.

14. The apparatus of claim 12, where the electrochemical cells are fuel cells, the air electrode contains doped $LaMnO_3$, the electrolyte is yttria stabilized zirconia and the fuel electrode contains a zirconia-nickel cermet material.

15. The apparatus of claim 12, where the spent fuel exit channel contains multiple entry ports along the length of the electrochemical cells and the reformable fuel mixture passes through a channel which has an associated porous outer partition containing catalytic reforming material.

16. The apparatus of claim 12, where the mixing apparatus is an ejector mechanism.

17. The apparatus of claim 12, where thin, gas impermeable material separates cell bundles in the generator chamber.

18. The apparatus of claim 12, also containing auxiliary, reformable fuel mixture channels feeding to the generator chamber with ports parallel to the axial length of the cells.

19. The apparatus of claim 12, where catalytic reforming material is distributed on the cells.

20. The apparatus of claim 15, where catalytic reforming material is also distributed on the cells.

21. The apparatus of claim 15, where the outer partition has ports along the length of the electrochemical cells, the axis of the ports is transverse to the exterior fuel electrode surfaces, and the partition has a nickel containing material distributed on its surface or impregnated into its volume.

22. The apparatus of claim 17, where the gas impermeable material is selected from the group consisting of metal and dense ceramic tiles.

23. The apparatus of claim 21, where the reformable fuel mixture passes through the ports of the partition and contacts the cells substantially transverse to the exterior electrode surfaces and along the length of the cells.

* * * * *